(12) United States Patent
Kim et al.

(10) Patent No.: US 11,029,580 B2
(45) Date of Patent: Jun. 8, 2021

(54) CAMERA MODULE AND OPTICAL DEVICE

(71) Applicant: LG INNOTEK CO., LTD., Seoul (KR)

(72) Inventors: Ki Cheol Kim, Seoul (KR); Eun Sung Seo, Seoul (KR); Ji Sung Kim, Seoul (KR); Chang Gyun Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/493,983

(22) PCT Filed: Mar. 16, 2018

(86) PCT No.: PCT/KR2018/003092
§ 371 (c)(1),
(2) Date: Sep. 13, 2019

(87) PCT Pub. No.: WO2018/169344
PCT Pub. Date: Sep. 20, 2018

(65) Prior Publication Data
US 2020/0124945 A1 Apr. 23, 2020

(30) Foreign Application Priority Data
Mar. 16, 2017 (KR) .................. 10-2017-0032996

(51) Int. Cl.
*G03B 17/12* (2021.01)
*H04N 5/225* (2006.01)
(52) U.S. Cl.
CPC ........... *G03B 17/12* (2013.01); *H04N 5/2254* (2013.01)

(58) Field of Classification Search
None
See application file for complete search history.

(56) References Cited

U.S. PATENT DOCUMENTS

| 2008/0042227 | A1  | 2/2008 | Asano et al. |
| 2009/0009857 | A1* | 1/2009 | Yamada ............. H04N 5/22521 359/352 |
| 2010/0158501 | A1* | 6/2010 | Kawai .................. H04N 5/2254 396/448 |
| 2013/0100538 | A1* | 4/2013 | Kim ....................... H04N 5/232 359/683 |

(Continued)

FOREIGN PATENT DOCUMENTS

JP 4871707 B2 2/2012
JP 2014-187160 A 10/2014
(Continued)

*Primary Examiner* — William B Perkey
(74) *Attorney, Agent, or Firm* — Birch, Stewart, Kolasch & Birch, LLP

(57) ABSTRACT

An embodiment of the present invention relates to a camera module and an optical device, comprising: a housing; a lens module disposed in the housing; a substrate disposed below the lens module; an image sensor disposed between the lens module and the substrate; and an optical element unit disposed between the lens module and the image sensor, wherein the optical element unit has an optical surface disposed at the top thereof, to which the light transmitted through the lens module is incident, comes in contact with a light receiving surface of the image sensor at the bottom thereof, and contains a material having a higher refractive index than air.

19 Claims, 6 Drawing Sheets

(56) References Cited

U.S. PATENT DOCUMENTS

| | | | |
|---|---|---|---|
| 2013/0194464 A1* | 8/2013 | Suzuki | H01L 27/14636 348/294 |
| 2014/0284746 A1 | 9/2014 | Suzuki et al. | |
| 2015/0260958 A1* | 9/2015 | Kosugou | H04N 5/2254 348/294 |
| 2015/0293283 A1* | 10/2015 | Nara | G02B 5/208 348/340 |
| 2016/0028983 A1 | 1/2016 | Uya et al. | |
| 2020/0124945 A1* | 4/2020 | Kim | G03B 17/12 |

FOREIGN PATENT DOCUMENTS

| | | |
|---|---|---|
| JP | 2016-25334 A | 2/2016 |
| KR | 10-2006-0075113 A | 7/2006 |
| WO | WO 2012/023272 A1 | 2/2012 |

\* cited by examiner

CAMERA MODULE AND OPTICAL DEVICE

CROSS REFERENCE TO RELATED APPLICATIONS

This application is the National Phase of PCT International Application No. PCT/KR2018/003092, filed on Mar. 16, 2018, which claims priority under 35 U.S.C. 119(a) to Patent Application No. 10-2017-0032996, filed in the Republic of Korea on Mar. 16, 2017, all of which are hereby expressly incorporated by reference into the present application.

TECHNICAL FIELD

The present invention relates to a camera module and an optical device.

BACKGROUND ART

The following description merely provides background information for the present embodiment and does not describe the prior art.

Camera modules photographing a subject as a photo or video can be combined with various devices and apparatuses. Particularly, due to the influence of the advancement and automation of vehicle parts, and the like, automobiles combined with camera modules are on the market. Camera modules are used by being built into front and rear surveillance cameras, black boxes, and the like of the automobiles.

Further, with the widespread use of various portable terminals and the commercialization of wireless Internet services, demands of consumers related to portable terminals have been diversified, and various kinds of camera modules have been installed in portable terminals.

Typical camera modules are filled with air inside. Therefore, air exists between the lens module and the image sensor. The refractive index of air is 1, which is somewhat smaller. As a result, the camera modules have a high F-number (the brightness of the image is inversely proportional to the square of the F-number), so there is a problem in that the brightness of the captured image is not secured.

DETAILED DESCRIPTION OF THE INVENTION

Technical Subject

In this embodiment, it is intended to provide a camera module capable of improving image brightness by interposing a material having a high refractive index between the lens module and the image sensor.

Technical Solution

A camera module of the present embodiment comprises: a housing; a lens module disposed in the housing; a substrate disposed below the lens module; an image sensor disposed between the lens module and the substrate; and an optical element unit disposed between the lens module and the image sensor, wherein the optical element unit has an optical surface disposed at the top thereof, to which the light transmitted through the lens module is incident, comes in contact with a light receiving surface of the image sensor at the bottom thereof, and may contain a material having a higher refractive index than that of air.

The optical element unit may accommodate the light receiving surface of the image sensor.

The optical element unit may accommodate the image sensor.

The optical element unit may contain silicon.

The optical element unit may comprise an optical lens unit wherein the optical surface is disposed; and an adhesive layer disposed between the optical lens unit and the image sensor, and being in contact with the light receiving surface of the image sensor at the bottom thereof.

It may further comprise a package comprising a base on which the image sensor is mounted and a sidewall portion protruding upward from the base such that the image sensor is disposed inside, the package being electrically connected to the substrate.

The optical element unit comprises: a silicon layer disposed on the top of the base and having a bottom in contact with the light receiving surface of the image sensor; and an optical lens unit having the optical surface disposed on a top surface thereof, wherein the optical lens unit may comprise: a body disposed on the top of the silicon layer; and a support extending from the body to the substrate and supporting the body.

The optical element unit may further comprise an adhesive layer disposed between the silicon layer and the body.

The optical element unit comprises: an adhesive layer disposed on the top of the base and having a bottom in contact with the light receiving surface of the image sensor; and an optical lens unit having the optical surface disposed on an upper surface thereof, wherein the optical lens unit may comprise: a body disposed on the top of the silicon layer; and a support extending from the body to the substrate and supporting the body.

An optical device of the present embodiment comprises: a body; a display unit disposed on one side of the body: and a camera module electrically connected to the display unit, wherein the camera module comprises: a housing: a lens module disposed inside the housing; a substrate disposed below the lens module; an image sensor disposed between the lens module and the substrate; and an optical element unit disposed between the lens module and the image sensor, and wherein the optical element unit has an optical surface disposed at the top thereof, to which the light transmitted through the lens module is incident, comes in contact with a light receiving surface of the image sensor at the bottom thereof, and may contain a material having a higher refractive index than that of air.

Advantageous Effects

The camera module of the present embodiment has a low F-number by an optical element unit which accommodates an image sensor and is filled with a material having a refractive index higher than that of air, thereby improving the brightness of an image. Further, the optical element unit can replace the final lens by forming a final optical surface through which an external light is transmitted since an optical surface is disposed on the top thereof. As a result, the total length of the camera module is shortened so that the module size can be reduced. Further, the present embodiment provides an optical device comprising such a camera module.

BEST MODE

Figure 1:
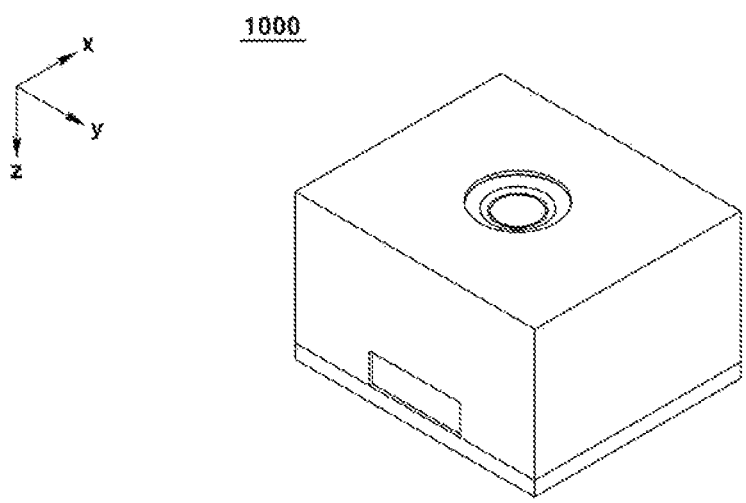
FIG. 1 is a perspective view showing a camera module of the present embodiment.

Hereinafter, some embodiments of the present invention will be described with reference to exemplary drawings. In describing the reference symbols of the components in the drawings, the same components are denoted by the same reference numerals whenever possible, even if they are shown on other drawings. In the following description of the embodiments of the present invention, a detailed description of known functions and configurations incorporated herein will be omitted when it may hinder the understanding of the embodiments of the present invention.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected," "coupled." or "jointed" to another component, the component may be directly connected, coupled, or jointed to the other component, however, it should be understood that another element may be "connected," "coupled" or "jointed" between components.

Hereinafter, the "up-and-down" direction may be the z-axis direction illustrated in the drawing. In this case, the arrow on the z-axis may face upward direction. The "front-to-rear" direction may be the x-axis direction illustrated in the drawing. In this case, the arrow on the x-axis may face forward direction. The "left-to-right" direction may be the y-axis direction illustrated in the drawing. In this case, the arrow on the y-axis may face the right side. On the other hand, "up-and-down direction" may mean "optical axis direction." In this case, the "optical axis direction" may mean the optical axis direction of the lens module 200.

Hereinafter, an optical device according to the present embodiment will be described.

The optical device may be a hand phone, a mobile phone, a smart phone, a portable smart device, a digital camera, a laptop computer, a digital broadcasting terminal, a personal digital assistant (PDA), a portable multimedia player (PMP), a navigation device, and the like. However, it is not limited thereto, and any device for photographing an image or a picture is possible.

The optical device may include a body (not shown), a display unit (not shown), a camera module 1000, and an electronic control unit.

The body may form the appearance of the optical device. The body may comprise, for example, a rectangular parallelepiped shape. However, it is not limited thereto. As a modified embodiment, the body may be roundly formed at least in part. The body may accommodate the camera module 1000. A display unit may be disposed on one side of the body.

The camera module 1000 may be disposed in the body. The camera module 1000 may be disposed on one side of the body. At least a part of the camera module 1000 may be accommodated inside the body. The camera module 1000 can capture an image of a subject. The camera module 1000 may be electrically connected to the display unit.

The display unit may be disposed in the body. The display unit may be disposed on one surface of the body. That is, the display unit may be disposed on the same surface as the camera module 1000. Alternatively, the display unit may be disposed on a surface different from the one surface of the body. The display unit may be disposed on a surface opposite to the surface where the camera module 1000 is disposed. The display unit can output the image photographed by the camera module 1000.

An electronic control unit (ECU) may be electrically connected to the camera module 1000 and the display unit. An electronic control unit (ECU) supplies or cuts off the power to turn on/off the power of the camera module 1000 and transmits various control signals to the camera module 1000, or may be delivered with image signals and the like. The camera module 1000 may receive control signals and perform various photographing functions. The electronic control unit can receive and convert image signals, and transmit the same to the display unit.

The electronic control unit may be present as a separate electrical component in the optical device, or may be built-in in the camera module 1000, or a part thereof is present as a separate electrical component while a part thereof may be built-in in the camera module 1000. When the electronic control unit is built-in in the camera module 1000, the electronic control unit may be built-in in the form that is being mounted on the substrate 500.

Figure 2:
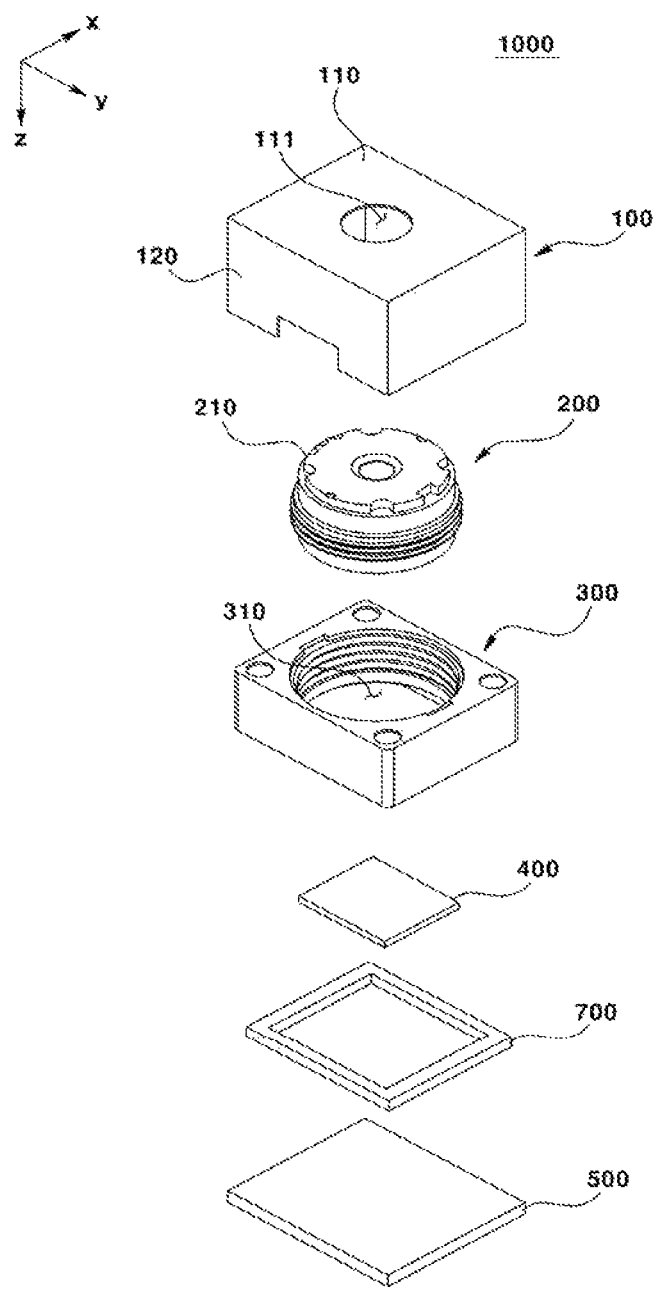
FIG. 2 is an exploded perspective view showing the camera module of the present embodiment except for the optical element unit.
Figure 3:
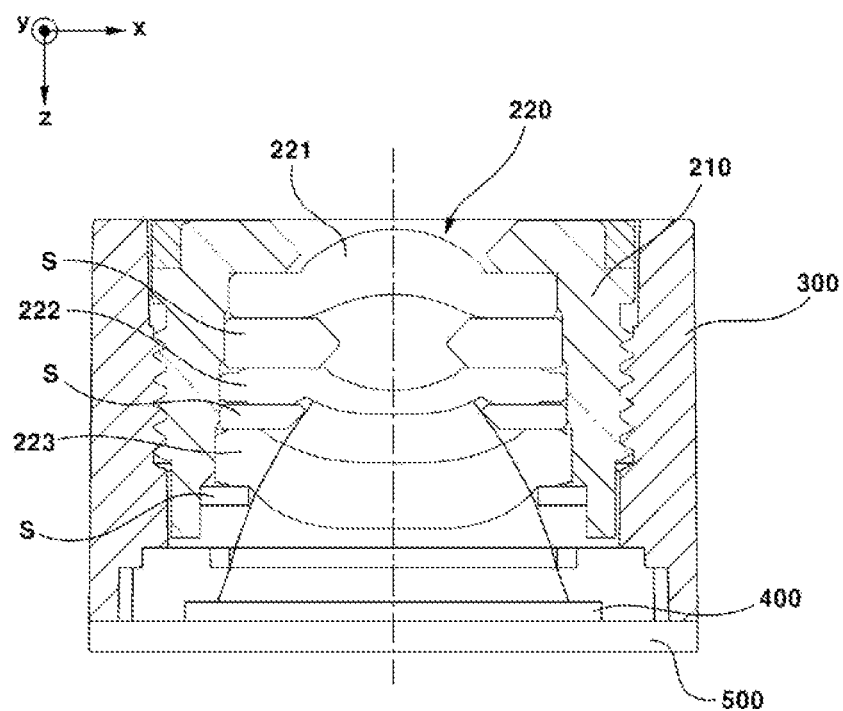
FIG. 3 is a cross-sectional view showing the camera module of this embodiment except for the cover member and the optical element unit.
Figure 4:
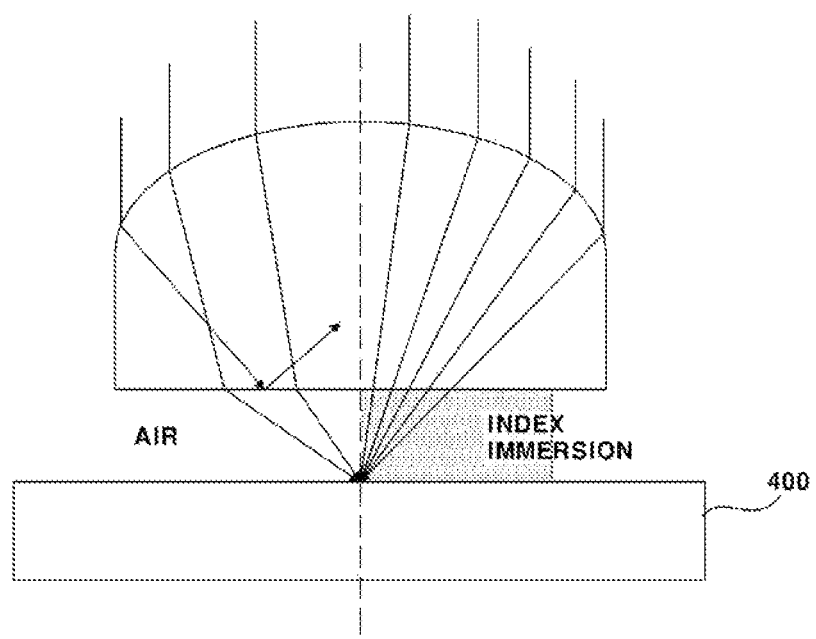
FIG. 4 is a conceptual diagram showing that the F-number is lowered by the optical element unit.
Figure 5:
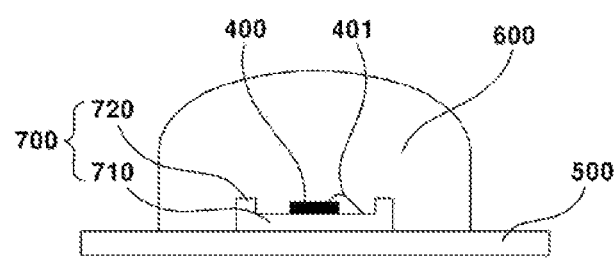
FIG. 5 is a conceptual view showing an optical element unit, an image sensor and a substrate of the first embodiment.
Figure 6:
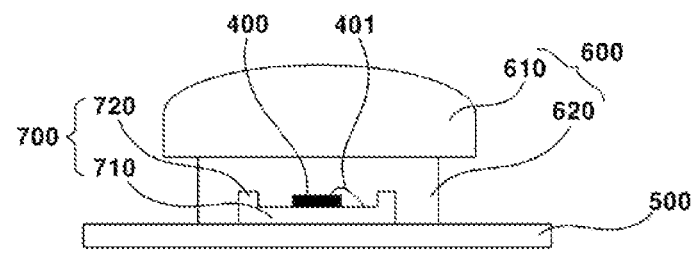
FIG. 6 is a conceptual view showing an optical element unit, an image sensor and a substrate of the second embodiment.
Figure 7:
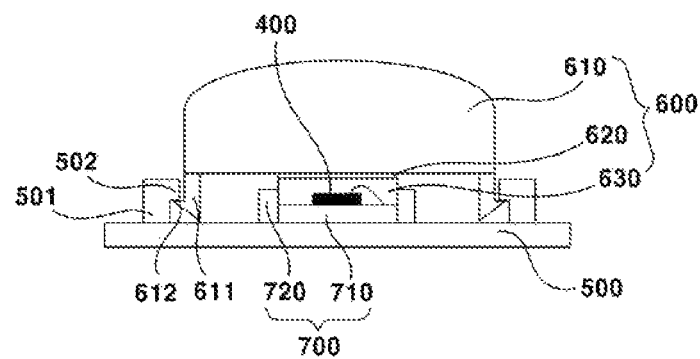
FIG. 7 is a conceptual view showing an optical element unit, an image sensor, and a substrate of the third embodiment.
Figure 8:
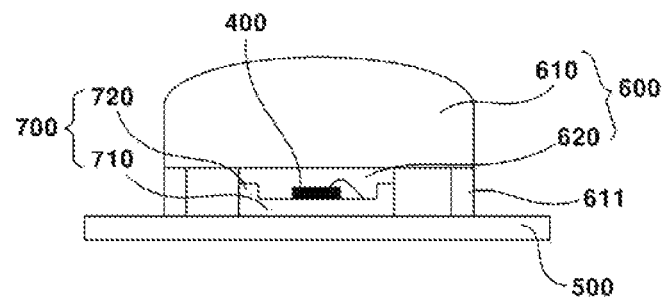
FIG. 8 is a conceptual diagram showing an optical element unit, an image sensor and a substrate of the fourth embodiment.

Hereinafter, the camera module 1000 of the present embodiment will be described with reference to the drawings. FIG. 1 is a perspective view showing a camera module of the present embodiment; FIG. 2 is an exploded perspective view showing the camera module of the present embodiment except for the optical element unit; FIG. 3 is a cross-sectional view showing the camera module of this embodiment except for the cover member and the optical element unit; FIG. 4 is a conceptual diagram showing that the F-number is lowered by the optical element unit; FIG. 5 is a conceptual view showing an optical element unit, an image sensor and a substrate of the first embodiment; FIG. 6 is a conceptual view showing an optical element unit, an image sensor and a substrate of the second embodiment; FIG. 7 is a conceptual view showing an optical element unit, an image sensor, and a substrate of the third embodiment; and FIG. 8 is a conceptual diagram showing an optical element unit, an image sensor and a substrate of the fourth embodiment.

The camera module 1000 of this embodiment may comprise a cover member 100, a lens module 200, a housing 300, an image sensor 400, a substrate 500, an optical element unit 600, and a package 700. The camera module 1000 of the present embodiment may have a first embodiment, a second embodiment, a third embodiment, and a fourth embodiment according to the arrangement and shape of the optical element unit 600. First, with reference to FIG. 1, FIG. 2, and FIG. 3, a configuration commonly applied to the first embodiment, the second embodiment, the third embodiment, and the fourth embodiment will be described except for the optical element unit 600.

The cover member 100 may be an external member of a hollow shape. The lens module 200, the housing 300, and the image sensor 400 can be accommodated inside the cover member 100. The substrate 500 may be disposed below the cover member 100. The cover member 100 may be supported by the substrate 500. The bottom of the cover member 100 may be fixed to the substrate 500. In this case, the cover member 100 and the substrate 500 may be fused or coupled by fusion.

The cover member 100 may be provided with a metal plate. The cover member 100 can shield electromagnetic interference (EMI). The cover member 100 can prevent externally generated radio waves from entering into the inside. The cover member 100 can prevent internally generated radio waves from being emitted to the outside. However, the material of the cover member 100 is not limited to metal. For example, the cover member 100 may be made of a plastic material. The cover member 100 may be manufactured by injection molding of a plastic material.

The cover member 100 may comprise a top plate 110 and a side plate 120. The top plate 110 and the side plate 120 may be integrally formed. The top plate 110 may be in the form of a square plate. A first hole 111 for introducing an external light may be formed at the center of the top plate 110. The lens module 200 may be exposed to the outside through the first hole 111 of the cover member 100. The side plates 120 may be disposed being extended downward from the respective sides of the top plate 110. The side plate 120 may be in the form of a square plate.

The lens module 200 may be disposed inside the cover member 100. The lens module 200 may be disposed inside the housing 300. The lens module 200 may comprise a lens holder 210 and one or more lenses 221, 222, and 223.

The lens holder 210 may be disposed inside the housing 300. The lens holder 210 and the housing 300 can be screw-coupled together using threads formed on the outer circumferential surface of the lens holder 210 and the inner surface of the housing 300. However, the coupling between the lens holder 210 and the housing 300 is not limited thereto. In one example, the lens holder 210 and the housing 300 may be coupled without a thread, and then adhered with an adhesive, and may be further adhered with an adhesive after screw-coupling.

Inside the lens holder 210, a space for accommodating the one or more lenses 221, 222, and 223 may be formed. An accommodating space of the lens holder 210 may be formed along the vertical direction. The top and the bottom of the lens holder 210 may be open due to the accommodating space.

One or more lenses 221, 222, and 223 may be disposed inside the lens holder 210. The lens holder 210 and the one or more lenses 221, 222, and 223 may be screw-coupled or adhered by an adhesive.

The inner space of the lens holder 210 may be disposed to be overlapped with the first hole 111 of the cover member 100 along the vertical direction. As a result, the light that has passed through the first hole 111 of the cover member 100 can be irradiated to the one or more lenses 221, 222, and 223.

The lens holder 210 may be omitted. In this case, the one or more lenses 221, 222, and 223 may be disposed directly inside the housing 300. The one or more lenses 221, 222, and 223 and the housing 300 may be screw-coupled or adhered together with an adhesive.

The one or more lenses 221, 222, and 223 may be a plurality of lenses arranged along the vertical direction with their optical axes aligned. The one or more lenses 221, 222, and 223 may be mounted in the accommodating space of the lens holder 210 and disposed inside the housing 300. However, it is not limited thereto. As described above, the one or more lenses 221, 222, and 223 may be disposed directly inside the housing 300 without the lens holder 210.

The one or more lenses 221, 222, and 223 may comprise a first lens 221, a second lens 222, and a third lens 223. The first lens 221, the second lens 222, and, the third lens 223 may be arranged in order from the top to the bottom. Spacers S may be interposed between the first lens 221, the second lens 222, and the third lens 223. The first lens 221, the second lens 222, and the third lens 223 may be disposed spaced apart by the spacers S. In this embodiment, the spacers S are disposed between the respective lenses, but the spacers S may be omitted according to optical design request.

The first lens 221 can be exposed to the outside through the top opening of the lens holder 210 and the first hole 111 of the cover member 100. External light can be incident on the first lens 221 for the first time. That is, the top surface of the first lens 221 may be the optical surface on which the external light first enters. The light incident on the first lens 221 passes through the second lens 222 and the third lens 223 in order and can be transmitted to the image sensor 400 after passing through the optical element unit 600.

The housing 300 may be disposed inside the cover member 100. The housing 300 may be disposed on the top of the substrate 500. The housing 300 may be supported by the substrate 500. The bottom of the housing 300 may be fixed to the substrate 500. The housing 300 and the substrate 500 may be fused or coupled by fusion. The lens module 200 may be disposed inside the housing 300. The image sensor 400 may be disposed inside the housing 200.

The housing 300 may be in the form of a rectangular parallelepiped. A second hole 310 may be formed in the center of the housing 300 along the vertical direction. The lens module 200 may be disposed in the second hole 310 of the housing 300. The second hole 310 of the housing 300 may have threads formed along the inner surface thereof and the lens holder 210 of the lens module 200 may have threads formed along the outer surface thereof. The lens holder 210 may be mounted on the housing 300 by screw-coupling of the threads formed on the outer surface of the lens holder 210 and the threads formed on the second hole 310. The image sensor 400 may be disposed in the second hole 310 of the housing 300 downwardly spaced apart with a gap from the lens module 200.

The image sensor 400 may be disposed on the substrate 500. The image sensor 400 may be electrically connected to the substrate 500. The image sensor 400 may be disposed inside the housing 300. The image sensor 400 is disposed below the lens module 200 and may be disposed between the substrate 500 and the lens module 200. The image sensor 400 may be disposed optically aligned with the optical axis of the lens module 200. The light transmitted through the lens module 200 may be irradiated to the image sensor 400.

The image sensor 400 may convert the irradiated light into an electronic signal. The top of the image sensor 400 may form a light receiving surface. The image sensor 400 (image sensor 400) may be an array of a plurality of photo diodes. The image sensor 400 may be a charge coupled device (CCD), metal oxide semiconductor (MOS), CPD, and CID. However, the type of the image sensor 400 is not limited thereto.

The electronic signal outputted from the image sensor 300 may be transmitted to the display unit through the electronic control unit. The electronic signal outputted from the image sensor 300 may be converted through the electronic control unit and inputted to the display unit. The electronic signal inputted to the display unit can be reproduced as an image or a video that can be viewed by the user.

The image sensor 400 may be packed in a package 700 and mounted on the substrate 500 in the form of a chip. The package 700 may be formed integrally with the substrate 500, or may be formed separately. In addition, the package 700 may be formed of the same material as the substrate 500, or may be formed of a different material. However, the package 700 may be omitted according to optical design request. The package 700 may be formed integrally with the substrate 500, or may be formed separately. In this case, the image sensor 400 may be directly mounted on the substrate 500. The package 700 may comprise a base 710 and a side wall portion 720. However, the side wall portion 720 of the package 700 may be omitted according to design request.

The base 710 is in the form of a plate, and circuits can be formed on the top and bottom surfaces thereof. The terminal of the circuit formed on the top surface of the base 710 may be electrically connected to the image sensor 400. The terminal of the circuit formed on the bottom surface of the base 710 may be electrically connected to the substrate 500.

The image sensor 400 may be mounted on the center of the top surface of the base 710. The image sensor 400 may be mounted on the base 710 by a surface mounting technology (SMT) process. For example, the base 710 and the image sensor 400 may be electrically connected by a wire 401.

A plurality of terminals may be disposed on the bottom surface of the base 710. The plurality of terminals formed on the bottom surface of the base 710 may be mounted on the substrate 500 by a surface mounting technology (SMT) process.

The side wall portion 720 may be protruded upward from the base 710. The vertical cross-section of side wall portion 720 may be in the form of a single closed curve. An image sensor 400 may be disposed inside the side wall portion 720. That is, the side wall portion 720 may be disposed along the circumference of the image sensor 400 mounted on the base 710. As a result, the top of the image sensor 400 may be open.

Generally, to protect the image sensor 400, a top opening formed by the side wall portion 720 is covered with a protective cap. However, in the camera module 1000 of the present embodiment, since the image sensor 400 can be protected by the optical element unit 600, which will be described later, the protective cap can be omitted.

The substrate 500 may be disposed on the bottom of the cover member 100. The substrate 500 may be disposed on the bottom of the lens module 200. The substrate 500 may be disposed on the bottom of the housing 300. The substrate 500 may support the cover member 100 and the housing 300.

The substrate 500 may be a printed circuit board (PCB). The image sensor 400 may be mounted on the substrate 500. An electronic control unit may be mounted on the substrate 500. The package 700 in which an image sensor 400 is packed may be mounted on the substrate 500.

A lower end of the side plate 120 of the cover member 100 may be disposed outside the top surface of the substrate 500.

A lower end of the housing 300 may be disposed on the outer side of the lower end of the side plate 120 of the cover member 100 on the top surface of the substrate 500. An image sensor 400 and a package 700 in which an image sensor 400 is packed may be disposed at the inner side (at the center) of the top surface of the substrate 500.

Hereinafter, the optical element unit 600 will be described. In the camera module 1000 of the present embodiment, the image sensor 400 can be accommodated in the optical element unit 600. The inside of the optical element unit 600 may be filled with a material having a refractive index higher than that of air. As a result, the camera module 1000 of the present embodiment has a low F-number and can enhance the brightness (sharpness, resolution) of the image.

The effect of the camera module 1000 of this embodiment will be described in detail with reference to FIG. 4. The left side of FIG. 4 shows the optical path when the optical element unit 600 is not present (filled with air), and the right side shows the optical path when the optical element unit 600 is present.

As shown in FIG. 4, in the case where the optical element unit 600 is not present, the final optical surface may be formed at the bottom surface of the lens of the lowermost lens of the lens module. An air layer exists between the final optical surface and the image sensor, and thereby the light transmitted through the final optical surface is refracted by the air layer. In addition, light reaching the final optical surface from the outermost side of the optical axis cannot be reached to the image sensor 400 due to total reflection.

On the contrary, in the case where the optical element unit 600 is present, the final optical surface can be formed on the top surface of the lowermost lens of the lens module. The optical element unit 600 is disposed between the lowermost lens and the image sensor 400, and thereby the refraction of light does not occur or it may occur less in the course of entering the optical element unit 600 from the lowermost lens.

As a result, in the case where the optical element unit 600 does not present, an external light can be incident on the image sensor 400 with a high incident angle or cannot be incident on the image sensor 400 and may be totally reflected. On the other hand, in the case where the optical element unit 600 is present, the external light can be incident on the image sensor 400 with a low incident angle.

The F-Number can be calculated by the following equation, and the brightness of the image is inversely proportional to the square of the F-Number. Here, H may be an angle between the optical axis and the light incident on the optical axis that is the most slanted light with respect to the optical axis.

$$F\text{-Number} = \frac{1}{2(\sin\theta)}$$

The F-number in the case where the optical element unit 600 is present may be lower than the F-number in the case where the optical element unit 600 is not present, so that the brightness of the image can be enhanced. On the other hand, reduction of lens diameter and focal length has mechanical and performance limitations. Therefore, the optical element unit 600 of the camera module 1000 of the present embodiment can realize an optical system that cannot be implemented with a conventional concept.

Hereinafter, the optical element unit 600 of this embodiment will be described in detail. This embodiment may be divided into a first embodiment, a second embodiment, a third embodiment, and a fourth embodiment according to the arrangement and the shape of the optical element unit 600.

First, the first embodiment will be described. FIG. 5 is a conceptual diagram showing an optical element unit 600, an image sensor 400, a package 700, and a substrate 500 of the first embodiment.

The optical element unit 600 may be disposed on the top of the substrate 500. The optical element unit 600 may be disposed spaced apart below the lens module 200. An optical surface 601 through which the light transmitted through the lens module 200 is incident may be disposed on the top of the optical element unit 600. The optical element unit 600 may be disposed between the lens module 200 and the image sensor 400. The optical element unit 600 can accommodate the image sensor 400. The bottom of the optical element unit 600 can be in contact with the light receiving surface of the image sensor 400. The optical element unit 600 can accommodate the package 700.

An optical surface 601 through which the light transmitted through the lens module 200 is incident may be formed on the top surface of the optical element unit 600. The optical surface 601 may have a shape convex upwardly. The optical surface 601 formed on the top of the optical element unit 600 may be the final optical surface. That is, the light incident on the optical surface 601 can be moved inside the optical element unit 600 and directly irradiated to the image sensor 400. Therefore, the optical element unit 600 of the first embodiment can replace the lowermost lens of the lens module 200. In this case, although the optical element unit 600 is disposed spaced apart from the lens module 200, the lens of the lens module 200 and the optical element unit 600 may constitute an optical system. In the camera module 1000 of the first embodiment, the number of members and the module size along the vertical direction can be reduced. That is, the total length of the camera module 1000 can be shortened.

The optical element unit 600 may comprise a light transmitting material. The optical element unit 600 may be formed by filling with a light transmitting material. The effective refractive index of the material constituting the optical element unit 600 may be 1.3 or more and 1.6 or less based on 700 nm wavelength. The optical element unit 600 may be filled with a material having a refractive index higher than that of air. As an example, the optical element unit 600 may be formed of light transmitting silicon.

In the first embodiment, the F-number is lowered by the optical element unit 600, and thereby the resolution and brightness of the image can be enhanced. In addition, due to the optical element unit 600, the image sensor 400 and the package 700 inside thereof can be protected from an external impact.

Hereinafter, the second embodiment will be described. FIG. 6 is a conceptual diagram showing an optical element unit 600, an image sensor 400, a package 700, and a substrate 500 of the second embodiment. The optical element unit 600 of the second embodiment may comprise an optical lens unit 610 and an adhesive layer 620. That is, the optical element unit 600 of the second embodiment may be made of different types of materials having different refractive indexes.

The optical lens unit 610 may be disposed between the adhesive layer 620 and the lens module 200. The optical lens unit 610 may be supported by the adhesive layer 620. The optical lens unit 610 may be disposed downwardly spaced apart from the lens module 200. An optical surface 601 on which the light transmitted through the lens module 200 is incident may be formed on the top surface of the optical lens unit 610.

The optical lens unit 610 may be formed of the same material as a general lens. The optical lens unit 610 may be formed by filling with a light-transmitting material. The effective refractive index of the material constituting the optical lens unit 610 may be 1.3 or more and 1.6 or less based on 700 nm wavelength. The optical lens unit 610 may be filled with a material having a refractive index higher than that of air. For example, the optical lens unit 610 may be made of silicon, glass, or plastic.

The adhesive layer 620 may be disposed on the bottom side of the optical lens unit 610. The top of the adhesive layer 620 and the bottom of the optical lens unit 610 can be in contact with each other. The adhesive layer 620 can support the optical lens unit 610.

The bottom of the adhesive layer 620 can be in contact with the light receiving surface of the image sensor 400. The adhesive layer 620 can accommodate the image sensor 400. The adhesive layer 620 can accommodate the package 700.

The adhesive layer 620 may be formed by filling with a light-transmitting adhesive. The effective refractive index of the material constituting the adhesive layer 620 may be 1.3 or more and 1.6 or less based on 700 nm wavelength. The adhesive layer 620 may be filled with a material having a refractive index higher than that of air. In one example, the adhesive layer 620 may be a light-transmitting epoxy.

The camera module 1000 of the second embodiment can be manufactured by a simple process in which an adhesive is applied to the image sensor 400 and the package 700 and then the optical lens unit 610 is raised.

Hereinafter, the third embodiment will be described. FIG. 7 is a conceptual diagram showing an optical element unit 600, an image sensor 400, a package 700, and a substrate 500 according to the third embodiment. The optical element unit 600 of the third embodiment may comprise an optical lens unit 610, an adhesive layer 620, and a silicon layer 630. That is, the optical element unit 600 of the third embodiment may be composed of different types of materials having different refractive indexes.

The optical lens unit 610 may be disposed between the silicon layer 630 and the lens module 200. An adhesive layer 620 is interposed between the optical lens unit 610 and the silicon layer 620 so that the optical lens unit 610 and the silicon layer 620 can be adhered. The optical lens unit 610 may be disposed downwardly spaced apart from the lens module 200. An optical surface 601 on which the light transmitted through the lens module 200 is incident may be formed on the top surface of the optical lens unit 610.

The optical lens unit 610 may be formed of the same material as a general lens. The optical lens unit 610 may be formed by filling with a light-transmitting material. The effective refractive index of the material constituting the optical lens unit 610 may be 1.3 or more and 1.6 or less based on 700 nm wavelength. The optical lens unit 610 may be filled with a material having a refractive index higher than that of air. For example, the optical lens unit 610 may be made of silicon, glass, or plastic.

The optical lens unit 610 may comprise a body disposed on the top of the silicon layer 620 and a support 611 being extended from the body to the substrate 500. The support 611 may be extended downward from the edge of the body of the optical lens unit 610. The support 611 is in contact with the top surface of the substrate 500, and thereby the optical lens unit 610 can be supported.

The support 611 is hook-coupled to the substrate 500 so that the optical lens unit 610 can be fixed thereto. To this end, a first hook 612 may be formed at the lower end of the support 611. A protrusion 501 protruding upward is formed on the substrate 500 and a second hook 502 may be formed on an upper end of the protrusion 501. The support 611 and the substrate 500 can be coupled when the first hook 612 and the second hook 502 are being hooked.

An adhesive layer 620 may be disposed between the optical lens unit 610 and the silicon layer 630. The adhesive layer 620 may perform the function of adhering the optical lens unit 610 and the silicon layer 630 to each other.

The adhesive layer 620 may be a light-transmitting adhesive. The effective refractive index of the adhesive layer 620 may be 1.3 or more and 1.6 or less based on 700 nm wavelength. The adhesive layer 620 may have a higher refractive index than that of air. In one example, the adhesive layer 620 may be a light-transmitting epoxy.

The silicon layer 630 may be disposed on the bottom of the central portion of the optical lens unit 610. Therefore, the support 611 may be disposed spaced apart from the silicon layer 630 along the horizontal (front-rear, left-right) direction. The bottom of the silicon layer 630 may be in contact with the light receiving surface of the image sensor 400. The silicon layer 630 may accommodate the image sensor 400. The silicon layer 630 may be disposed on the top of a base 710. The side surface of the silicon layer 630 may be in contact with a side wall portion 720.

The silicon layer 630 may be a silicon-based material. The effective refractive index of the silicon layer 630 may be 1.3 or more and 1.6 or less based on 700 nm wavelength. The adhesive layer 630 may have a higher refractive index than that of air.

The camera module 1000 of the third embodiment can be manufactured in a way that the silicone layer 630 is applied to the base 710 and cured, and then the lens is fixed with an adhesive. The sidewall portion 720 performs the same function as the mold so that the silicon layer 620 is precisely applied to the image sensor 400. In addition, the optical lens unit 610 can be stably fixed by hook-coupling between the adhesive layer 620 and the substrate 500. As a result, a precise optical system can be configured.

Hereinafter, the fourth embodiment will be described. FIG. 8 is a conceptual diagram showing an optical element unit 600, an image sensor 400, a package 700, and a substrate 500 of the fourth embodiment. The optical element unit 600 of the fourth embodiment may comprise an optical lens unit 610 and an adhesive layer 620. That is, the optical element unit 600 of the fourth embodiment may be composed of different types of materials having different refractive indexes.

The optical lens unit 610 may be disposed between the adhesive layer 620 and the lens module 200. The optical lens unit 610 can be supported by the adhesive layer 620. The optical lens unit 610 may be disposed downwardly spaced apart from the lens module 200. An optical surface 601 on which the light transmitted through the lens module 200 is incident may be formed on the top surface of the optical lens unit 610.

The optical lens unit 610 may be formed of the same material as a general lens. The optical lens unit 610 may be formed by filling with a light-transmitting material. The effective refractive index of the material constituting the optical lens unit 610 may be 1.3 or more and 1.6 or less based on 700 nm wavelength. The optical lens unit 610 may be filled with a material having a refractive index higher than that of air. For example, the optical lens unit 610 may be made of silicon, glass, or plastic.

The optical lens unit 610 may comprise a body disposed on the top of the silicon layer 620 and a support 611 being extended from the body to the substrate 500. The support 611 may be extended downward from the edge of the body of the optical lens unit 610. The support 611 is in contact with the top surface of the substrate 500, and thereby the optical lens unit 610 can be supported.

The silicon layer 630 may be disposed on the bottom of the central portion of the optical lens unit 610. Therefore, the support 611 may be disposed spaced apart from the adhesive layer 620 along the horizontal (front-rear, left-right) direction. The bottom of the adhesive layer 620 may be in contact with the light receiving surface of the image sensor 400. The adhesive layer 620 may accommodate the image sensor 400. The adhesive layer 620 may be disposed on the top of a base 710. The side surface of the adhesive layer 620 may be in contact with a side wall portion 720.

The adhesive layer 620 may be a light-transmitting adhesive. The effective refractive index of the adhesive layer 620 may be 1.3 or more and 1.6 or less based on 700 nm wavelength. The adhesive layer 620 may have a higher refractive index than that of air. In one example, the adhesive layer 620 may be a light-transmitting epoxy.

The camera module 1000 of the fourth embodiment can be manufactured in a way that the adhesive layer 620 is applied to the base 710 and cured, and then the lens is fixed with an adhesive. The sidewall portion 720 performs the same function as the mold so that the adhesive layer 620 is precisely applied to the image sensor 400. In addition, the optical lens unit 610 can be stably fixed by hook-coupling between the adhesive layer 620 and the substrate 500. As a result, a precise optical system can be configured.

In the above, to have been described as all the components that make up the embodiments of the present invention may operate in combination, or combined into one, but the invention is not necessarily limited to these examples. That is, if the object in the scope of the present invention, may be that all of the components are selectively operates in conjunction with more than one. In addition, terms such as "inclusive and". "is configured" or "have" described above is because, which means that unless there is a particular of stated that, the component can be embedded, except for the different components it should not be construed to further comprise other components. All technical and scientific terms comprising terms, there is a one, the same meaning as commonly understood by one of ordinary skill in the art unless otherwise defined. As the term is defined in advance commonly used terms are to be interpreted to mean that match on the context of the relevant art, a, shall not be interpreted to have an idealistic or excessively formalistic meaning unless clearly defined in the present invention.

The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as included in the scope of the present invention.

The invention claimed is:

1. A camera module comprising:
   a housing;
   a lens module disposed in the housing;
   a substrate disposed below the lens module;
   an image sensor disposed between the lens module and the substrate; and
   an optical element unit disposed between the lens module and the image sensor,
   wherein the optical element unit has an optical surface disposed at the top thereof, to which the light transmitted through the lens module is incident, comes in contact with a light receiving surface of the image sensor at the bottom thereof, and contains a material having a higher refractive index than that of air,
   wherein the optical element unit includes an optical lens unit having the optical surface, and
   wherein an adhesive layer is disposed between the optical lens unit and the image sensor, the adhesive layer being in contact with the light receiving surface of the image sensor at the bottom thereof.

2. The camera module according to claim 1, wherein the optical element unit accommodates the light receiving surface of the image sensor.

3. The camera module according to claim 1, wherein the optical element unit accommodates the image sensor.

4. The camera module according to claim 1, wherein the optical element unit contains silicon.

5. The camera module according to claim 1, further comprising a package comprising a base on which the image sensor is mounted.

6. A camera module comprising:
   a housing;
   a lens module disposed in the housing;
   a substrate disposed below the lens module;
   an image sensor disposed between the lens module and the substrate;
   an optical element unit disposed between the lens module and the image sensor, the optical element unit having an optical surface disposed at the top thereof, to which the light transmitted through the lens module is incident, comes in contact with a light receiving surface of the image sensor at the bottom thereof, and contains a material having a higher refractive index than that of air; and
   a package located between the image sensor and the substrate, the package including:
      a base on which the image sensor is mounted; and
      a sidewall portion protruding upward from the base such that the image sensor is disposed inside the sidewall portion.

7. The camera module according to claim 6, wherein the package is electrically connected to the substrate.

8. The camera module according to claim 7, wherein the optical element unit comprises:
   a silicon layer disposed on the top of the base and having a bottom in contact with the light receiving surface of the image sensor; and
   an optical lens unit having the optical surface disposed on an upper surface thereof.

9. The camera module according to claim 8, wherein the optical lens unit comprises:
   a body disposed on the top of the silicon layer; and
   a support extending from the body to the substrate and supporting the body.

10. The camera module according to claim 9, wherein the optical element unit further comprises an adhesive layer disposed between the silicon layer and the body.

11. The camera module according to claim 7, wherein the optical element unit comprises:
    an adhesive layer disposed on the top of the base and having a bottom in contact with the light receiving surface of the image sensor; and
    an optical lens unit having the optical surface disposed on an upper surface thereof.

12. The camera module according to claim 11, wherein the optical lens unit comprises:
    a body disposed on the top of the silicon layer; and
    a support extending from the body to the substrate and supporting the body.

13. An optical device comprising:
    a body;
    a display unit disposed on one side of the body; and
    a camera module electrically connected to the display unit,
    wherein the camera module comprises:
       a housing;
       a lens module disposed inside the housing;
       a substrate disposed below the lens module;
       an image sensor disposed between the lens module and the substrate; and
       an optical element unit disposed between the lens module and the image sensor,
    wherein the optical element unit has an optical surface disposed at the top thereof, to which the light transmitted through the lens module is incident, comes in contact with a light receiving surface of the image sensor at the bottom thereof, and contains a material having a higher refractive index than air,
    wherein the optical element unit includes an optical lens unit having the optical surface, and
    wherein an adhesive layer is disposed between the optical lens unit and the image sensor, the adhesive layer being in contact with the light receiving surface of the image sensor at the bottom thereof.

14. The optical device according to claim 13, wherein the optical element unit accommodates the light receiving surface of the image sensor.

15. The optical device according to claim 13, wherein the optical element unit accommodates the image sensor.

16. The optical device according to claim 13, wherein the optical element unit contains silicon.

17. An optical device comprising:
    a body;
    a display unit disposed on one side of the body; and
    a camera module electrically connected to the display unit, the camera module including:
       a housing;
       a lens module disposed inside the housing;
       a substrate disposed below the lens module;
       an image sensor disposed between the lens module and the substrate; and
       an optical element unit disposed between the lens module and the image sensor, the optical element unit having an optical surface disposed at the top thereof, to which the light transmitted through the lens module is incident, comes in contact with a light receiving surface of the image sensor at the bottom thereof, and contains a material having a higher refractive index than that of air; and
       a package located between the image sensor and the substrate, the package including:

a base on which the image sensor is mounted; and a sidewall portion protruding upward from the base such that the image sensor is disposed inside the sidewall portion.

18. The optical device according to claim 17, wherein the optical element unit comprises:

a silicon layer disposed on the top of the base and having a bottom in contact with the light receiving surface of the image sensor; and an optical lens unit having the optical surface disposed on an upper surface thereof.

19. The optical device according to claim 18, wherein the package is electrically connected to the substrate.

* * * * *